UNITED STATES PATENT OFFICE.

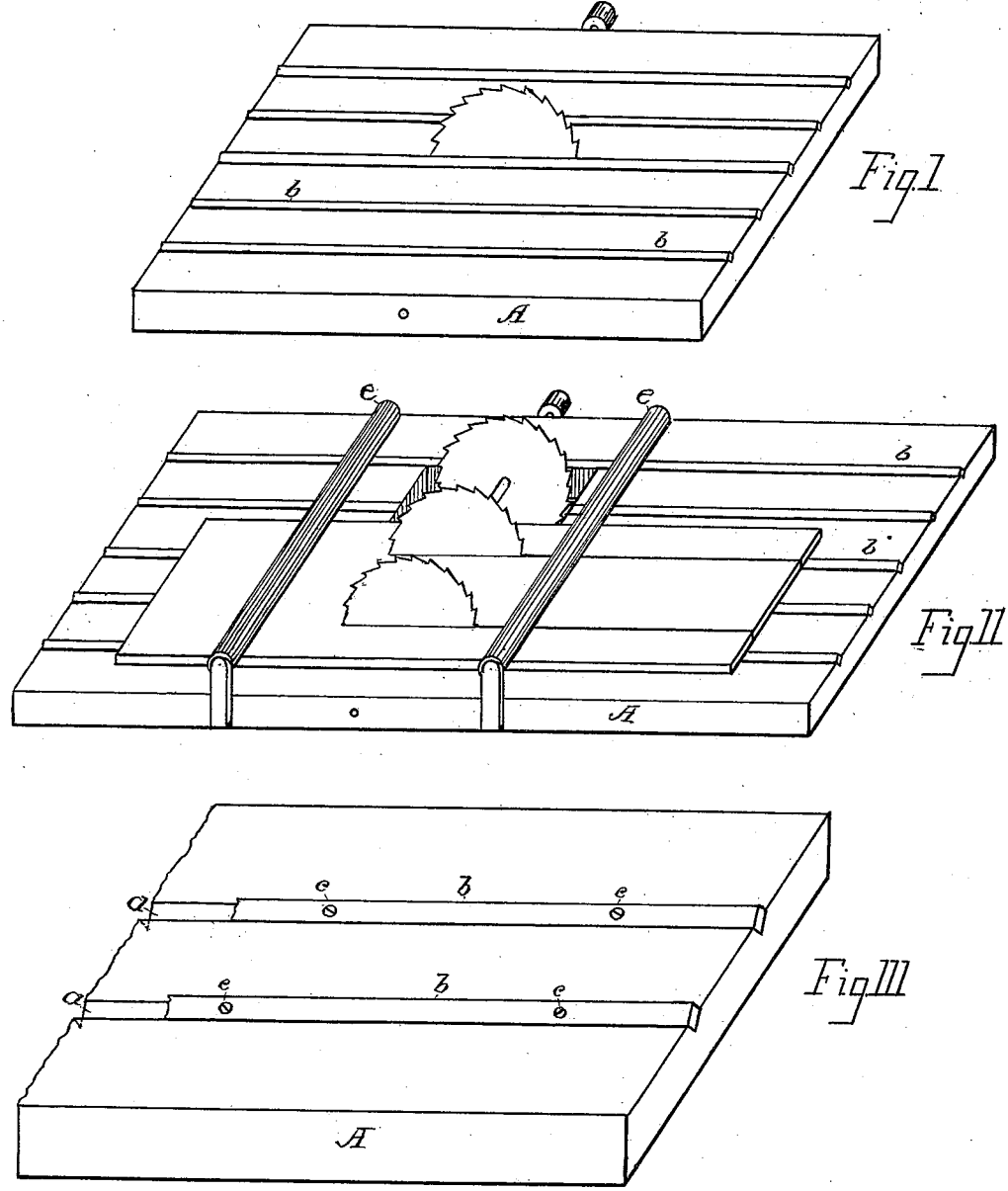

ESAU TARRANT, OF MUSKEGON, MICHIGAN.

SAWING-MACHINE TABLE.

SPECIFICATION forming part of Letters Patent No. 269,349, dated December 19, 1882.

Application filed August 28, 1882. (No model.)

*To all whom it may concern:*

Be it known that I, ESAU TARRANT, a citizen of the United States, residing at Muskegon, in the county of Muskegon and State of Michigan, have invented certain new and useful Improvements in Sawing-Machine Tables; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in that class of "sawing machinery" in which the lumber to be cut has, as a general thing, already been cut into the form of boards, planks, or cants, so that it has flat surfaces, and may be carried forward to the saws and away from them upon a table or stationary platform, over the surface of which it is moved, either by the hand of the operator or any of the well-known feeding devices in use with such machines, the object of this invention being to avoid a difficulty heretofore encountered in operating these machines, caused by the tendency of the lumber to move laterally one side of a rectilinear line, parallel with the sides of the saw or saws, thus causing the latter to be in danger of breaking, as well as making crooked and unmarketable lumber. These difficulties are avoided in the machine hereinafter described by furnishing the surface of the table or platform upon which the lumber is moved with a series of upwardly-projecting guide-strips, which are parallel with the line of cut of the saws, and have sharp upper edges, which slightly embed themselves in the lower surface of the lumber and prevent all tendency toward a lateral movement, thus allowing the saws to run freely and preventing the formation of crooked and unmarketable lumber.

In order to carry out my invention practically, I prefer to employ the construction shown in the accompanying drawings, and described in the following specification.

Figure I of the drawings is a perspective view, showing an ordinary sawing-machine table provided with the guide-bars. Fig. II is a similar view, showing the invention applied to a gang-edger. Fig. III is an enlarged detail view, showing the method of applying the parallel guide-bars to the saw-table.

In describing the invention as illustrated by the drawings, it will be understood that they illustrate but one method of applying the guide-bars to the saw-tables; but it will be apparent that this may be varied without departing from the spirit of my invention. As, for instance, the form of the bars in cross-sections may be varied from square, as shown, to a lozenge, giving sharper angles, or to any other form that in the opinion of the constructer will best perform the office of guiding the quality of lumber to be operated upon through the machine in a straight line.

It will be understood that the quality of the lumber must affect the form of the guiding-edges, as in sawing hard lumber or woods a sharper edge will be needed to enter and retain its hold upon the board than would be required in sawing pine or other soft woods; and, again, the drawings show the guide-bars applied to a table formed of wood; but these tables are sometimes of metal, in which case the bars may be formed as longitudinal ribs or projections upon their upper surface, which will prove as efficient in service as those applied to the tables of wood, in the manner hereinafter described.

A represents the wooden table or platform of a sawing-machine, upon which the lumber is placed and fed forward to the saw or saws, as the case may be. The ordinary simple saw-table has but a single saw, as shown in Fig. I, while the tables of edgers and other sawing-machines used for edging and slitting lumber are commonly supplied with several saws, as illustrated by Fig. II. The upper surface of these tables is provided with a series of longitudinal grooves, $a'$ $a'$, in which are placed the rectangular bars $b$ $b$, with one corner projecting upward above the surface of the table, thus forming a sharp edge parallel with the sides of the saw or line of cut, upon which the lumber rests as it passes the saws, and is retained in its proper position with relation to them. These bars may be secured in place by screws, as $c$ $c$, passing through the bars and entering the table diagonally, as shown in Fig. III. In edgers and similar machines using gangs of saws, feeding and pressure rollers, as *e e*, Fig. II, are commonly employed to feed forward and hold the lumber down upon the table; but these devices form no part of my present invention. It will be apparent that the number of these guide-bars upon a saw-table must be governed by the needs of the case. Sometimes it will be necessary to place them at certain distances apart over the whole surface of the table; in others only a portion—as one side of the saw—need be furnished with them.

Having thus described my invention, I claim as new, and desire to secure by Letters Patent, the following:

1. In a sawing-machine, a saw-table provided with a longitudinal series of angular guide-bars projecting above the surface of the table in lines parallel with the sides of the saws or line of cut, and acting directly on the lower surface of the lumber to be cut, for the purpose of keeping the lumber in its proper position with relation to the saws, as set forth.

2. A saw-table provided with a series of angular grooves in its upper surface, in combination with a series of angular bars placed in said grooves projecting above the surface of the table, and secured thereto by screws passing diagonally through the bars and into the table, as shown and described.

In testimony whereof I affix my signature in presence of two witnesses.

ESAU TARRANT.

Witnesses:
RICHARD DULMAGE,
ARTHUR BURWASH.